(12) United States Patent
Jeon et al.

(10) Patent No.: US 9,005,752 B2
(45) Date of Patent: *Apr. 14, 2015

(54) DRAWN POLY(ETHYLENETEREPHTHALATE) FIBER, POLY(ETHYLENETEREPHTHALATE) TIRE-CORD, THEIR PREPARATION METHOD AND TIRE COMPRISING THE SAME

(75) Inventors: Ok-Hwa Jeon, Gyeongsan-shi (KR); Il Chung, Goomi-shi (KR); Gi-Woong Kim, Daegu (KR)

(73) Assignee: Kolon Industries, Inc., Kwacheon (KR)

(*) Notice: Subject to any disclaimer, the term of this patent is extended or adjusted under 35 U.S.C. 154(b) by 765 days.

This patent is subject to a terminal disclaimer.

(21) Appl. No.: 12/663,681

(22) PCT Filed: Jun. 20, 2008

(86) PCT No.: PCT/KR2008/003527
§ 371 (c)(1),
(2), (4) Date: Dec. 8, 2009

(87) PCT Pub. No.: WO2008/156333
PCT Pub. Date: Dec. 24, 2008

(65) Prior Publication Data
US 2010/0175803 A1 Jul. 15, 2010

Related U.S. Application Data

(60) Provisional application No. 61/047,533, filed on Apr. 24, 2008, provisional application No. 61/047,517, filed on Apr. 24, 2008, provisional application No. 61/047,480, filed on Apr. 24, 2008.

(30) Foreign Application Priority Data

Jun. 20, 2007 (KR) .................. 10-2007-0060370
Mar. 31, 2008 (KR) .................. 10-2008-0029558
Mar. 31, 2008 (KR) .................. 10-2008-0029559

(51) Int. Cl.
*D02G 3/00* (2006.01)
*D01D 5/12* (2006.01)
(Continued)

(52) U.S. Cl.
CPC ............ *D01F 6/62* (2013.01); *B60C 9/0042* (2013.04); *D02G 3/48* (2013.01); *D10B 2331/04* (2013.01)

(58) Field of Classification Search
USPC .......... 428/364, 902, 375; 264/210.8, 211.14, 264/211.17, 290.5
See application file for complete search history.

(56) References Cited

U.S. PATENT DOCUMENTS 3,946,100 A * 3/1976 Davis et al. ............ 264/211.15
3,966,867 A 6/1976 Munting
(Continued)

FOREIGN PATENT DOCUMENTS

JP 59125906 A 7/1984
JP 61-019812 A 1/1986
(Continued)

OTHER PUBLICATIONS

European Search Report issued in corresponding EP Application No. 08766486.8, dated Dec. 20, 2010.
(Continued)

*Primary Examiner* — Jeremy R Pierce
(74) *Attorney, Agent, or Firm* — Sughrue Mion, PLLC

(57) ABSTRACT

The present invention relates to a drawn PET fiber which has good dimensional stability and can be applied to a cap ply cord for a pneumatic tire, a PET tire cord, their preparation methods, and a tire including the same.

35 Claims, 2 Drawing Sheets

1. Tread
2. Shoulder
3. Side wall
4. Cap ply
5. Belt
6. Body ply
7. Inner liner
8. Apex
9. Bead

(51) Int. Cl.
*B29C 47/88* (2006.01)
*D02J 1/22* (2006.01)
*D01F 6/62* (2006.01)
*B60C 9/00* (2006.01)
*D02G 3/48* (2006.01)

(56) References Cited

U.S. PATENT DOCUMENTS

| | | | |
|---|---|---|---|
| 4,827,999 A | | 5/1989 | Yabuki et al. |
| 5,049,339 A | | 9/1991 | Hrivnak et al. |
| 5,102,603 A | | 4/1992 | Oblath et al. |
| 5,137,670 A | | 8/1992 | Murase et al. |
| 5,388,628 A | * | 2/1995 | Tamura ............ 152/556 |
| 5,472,781 A | * | 12/1995 | Kim et al. ............ 428/364 |
| 5,558,935 A | * | 9/1996 | Tanaka et al. ............ 428/364 |
| 5,658,665 A | | 8/1997 | Kim et al. |
| 5,894,875 A | * | 4/1999 | Masaki et al. ............ 152/527 |
| 6,764,623 B2 | | 7/2004 | Kim et al. |
| 6,967,058 B2 | | 11/2005 | Park et al. |
| 2001/0039988 A1 | * | 11/2001 | Kim et al. ............ 428/364 |
| 2003/0047834 A1 | | 3/2003 | Oh et al. |

FOREIGN PATENT DOCUMENTS

| | | |
|---|---|---|
| JP | 62-069819 A | 3/1987 |
| JP | 63227811 A | 9/1988 |
| JP | 01282306 A | 11/1989 |
| JP | 03124812 A | 5/1991 |
| JP | 04057914 A | 2/1992 |
| JP | 07-070819 A | 3/1995 |
| JP | 200096370 A | 4/2000 |
| JP | 2006-188796 A | 7/2006 |
| JP | 2007-022366 A | 2/2007 |

OTHER PUBLICATIONS

Japanese Patent Office, Japanese Office Action issued in corresponding JP Application No. 2010-513124, dated Aug. 28, 2012.

* cited by examiner

DRAWN POLY(ETHYLENETEREPHTHALATE) FIBER, POLY(ETHYLENETEREPHTHALATE) TIRE-CORD, THEIR PREPARATION METHOD AND TIRE COMPRISING THE SAME

BACKGROUND OF THE INVENTION (a) Field of the Invention

The present invention relates to a drawn polyethylene terephthalate (PET) fiber, a PET tire cord, their preparation methods, and a tire including the same. More particularly, the present invention relates to a drawn PET fiber that has good dimensional stability and can be applied to a cap ply cord for a pneumatic tire, a PET tire cord, their preparation method, and a tire including the same.

(b) Description of the Related Art

A tire is a complex body of fiber/steel/rubber, and generally has a structure as illustrated in FIG. 1. That is, the steel and fiber cords take a role of reinforcing the rubber and form a basic skeletal structure in the tire. It is, so to speak, like the role of a bone in a human body.

As a reinforcement of the tire, the performances such as fatigue resistance, shear strength, durability, repelling elasticity, adhesion to a rubber, and the like are required to the cord. Therefore, various cords made of suitable materials are used according to the performances required to the tire.

Recently, rayon, nylon, polyester, steel, aramid, and the like are generally used as the materials for the cord, and the rayon and the polyester are used for a body ply (or a carcass) (6 in FIG. 1), the nylon is mainly used for a cap ply (4 in FIG. 1), and the steel and the aramid are mainly used for a tire-belt part (5 in FIG. 1).

The structure and the characteristics of the tire represented in FIG. 1 are briefly disclosed hereinafter.

Tread 1: A part contacting to the road surface; this part must provide a friction force necessary for braking and driving, be good in abrasion resistance, and also be able to stand against an external shock, and its heat generation must be small.

Body ply (or Carcass) 6: A cord layer inside the tire; this part must support a load and stand against a shock, and its fatigue resistance against bending and stretching movement during a driving must be good.

Belt 5: This part is located between the body plies and mostly composed of steel wire, and it lessens the external shock and also makes the ground contacting surface of the tread wide and the driving stability good.

Side wall 3: A rubber layer between the lower part of the shoulder 2 and the bead 9; it takes a role of protecting the internal body ply 6.

Bead 9: A square or hexagonal wire bundle, wherein a rubber is coated on the steel wires; it takes a role of fitting and fixing the tire to a rim.

Inner liner 7: A part located inside the tire instead of a tube; it makes a pneumatic tire possible by preventing air leakage.

Cap ply 4: A special cord fabric located on the belt of a radial tire for some passenger cars; it minimizes the movement of the belt during driving.

Apex 8: A triangular rubber packing material used for minimizing the dispersion of the bead, protecting the bead by relieving the external shock, and preventing an air inflow during shaping.

Recently, developments for tires suitable for high speed driving are required as the passenger cars gentrify, and accordingly the stability during high speed driving and high durability of the tire are recognized as greatly important characteristics. Furthermore, the performance of the materials for the cap ply cord importantly comes to the force before everything else for satisfying the characteristics.

The steel belt inside the tire is generally arranged in the oblique direction, the steel belt, however, tends to move toward the circumferential direction during high speed driving, and there are some problems that the sharp ends of the steel belt may cause separation between the layers of the belt and shape deformation of the tire by cutting the rubber or generating cracks. The cap ply prevents the separation between the layers and the deformation of the shape of the tire and takes a role of improving the high speed durability and the driving stability by restraining the movement of the steel belt.

A nylon 66 cord is mainly used for general cap ply cord. The nylon 66 cord may show the effect of restraining the movement of the belt by showing high shrinkage force at the stiffening temperature of 180° C. and wrapping the steel belt, however, it has disadvantages in that partial deformation may be caused by the load of the tire and the car and it may clatter during driving because it has low dimensional stability.

Furthermore, the shape of the nylon 66 cord may be easily deformed and the deformed nylon 66 results in tire deformation when the load given to the nylon 66 cord is changed by the change of the driving speed of the car and the controllability and the riding comport of a car may be decreased accordingly, because the nylon 66 cord has low dimensional (shape) stability.

On the other hand, a general PET fiber or a PET high modulus low shrinkage (HMLS) fiber which is mostly used as an industrial fiber has good dimensional stability in comparison with the nylon 66, but it is hard to be preferably used for the cap ply cord because the effect of restraining the movement of the belt by wrapping the steel belt is inferior to the nylon 66. In addition, the external shape may be easily deformed and may deform the tire when the load given to the cord composed of the material is changed by the change of the driving speed of the car, because the general PET fiber or the PET HMLS fiber does not have sufficient dimensional stability either. Therefore, even in case of using the cord composed of these materials as the cap ply cord, the controllability and the riding comport of the car are insufficient, because the external shape of the cord may be easily deformed and thus the tire may be deformed, as the load given to the cord is changed by the change of the driving speed of the car.

SUMMARY OF THE INVENTION

An aspect of the present invention is to provide a drawn PET fiber which is superior in the dimensional stability and also makes it possible to provide a tire cord that can be preferably applied to a cap ply cord.

Another aspect of the present invention is to provide a PET tire cord that shows superior dimensional stability and also can restrain the movement of the steel belt effectively and be applied to a cap ply cord.

Still another aspect of the present invention is to provide preparing methods of the drawn PET fiber and the tire cord.

Still another aspect of the present invention is to provide a tire including the PET tire cord.

The present invention provides a drawn PET fiber including 90 mol % or more of PET, wherein the shrinkage rate under the conditions of the load of 226 g/1000 d and the temperature of 180° C. is 25% or more of the shrinkage rate under the conditions of the load of 20 g/1000 d and the same temperature.

The present invention also provides a preparing method of a drawn PET fiber including steps of melt-spinning a polymer including 90 mol % or more of PET so as to prepare an undrawn PET fiber having crystallinity of 25% or more and an amorphous orientation factor (AOF) of 0.15 or less, and drawing the undrawn PET fiber with a drawing ratio of 0.1 to 1.55 so as to prepare the drawn PET fiber.

The present invention also provides a PET tire cord including the drawn PET fiber.

The present invention also provides a PET tire cord of which a shrinkage behavior index (SBI) defined by the following Calculation Formula 1 is 0.1 (g/d)/% or more under the conditions of the load of 0.0565 g/d and the temperature of 180° C.:

Shrinkage behavior index(SBI)=Shrinkage force (g/d)/ Shrinkage rate(%). [Calculation Formula 1]

The present invention also provides a PET tire cord of which the shrinkage rate under the conditions of the load of 226 g/cord and the temperature of 180° C. is 50% or more of the shrinkage rate under the conditions of the load of 20 g/cord and the same temperature.

The present invention also provides a preparing method of a PET tire cord including steps of melt-spinning a polymer including 90 mol % or more of PET so as to prepare a undrawn PET fiber having crystallinity of 25% or more and an amorphous orientation factor (AOF) of 0.15 or less, drawing the undrawn PET fiber with a drawing ratio of 0.1 to 1.55 so as to prepare a drawn PET fiber, and twisting the drawn PET fibers and dipping the same in an adhesive.

The present invention also provides a pneumatic tire including the present PET tire cord.

DETAILED DESCRIPTION OF THE PREFERRED EMBODIMENTS

Hereinafter, the drawn PET fiber, the PET tire cord, the preparing methods thereof, and the tire including the same are explained in more detail according to the specific embodiments of the present invention. However, since the embodiments are provided as examples of the present invention, the scope of the right of the present invention is not limited to or by them and it is obvious to a person skilled in the related art that various modifications of the embodiments are possible within the scope of the right of the present invention.

In addition, the term 'include' or 'comprise' means that include any component (or any element) without particular limitations unless otherwise mentioned in the present entire disclosure, and it cannot be interpreted as it excludes the addition of the other components (or elements).

The drawn polyethylene terephthalate (PET) fiber is prepared by melt-spinning the PET so as to prepare the undrawn fiber, and drawing the undrawn fiber, and the PET tire cord, a dip cord type, may be prepared by twisting the PET drawn fibers, and dipping the same into the adhesive.

Therefore, the properties of the undrawn fiber prepared by the melt-spinning of the PET and the drawn fiber prepared by drawing the same are directly or indirectly reflected to the properties of the tire cord.

According to one embodiment of the present invention, the drawn PET fiber having required properties is provided. The drawn PET fiber includes 90 mol % or more of the PET and its shrinkage rate under the conditions of the load of 226 g/1000 d and the temperature of 180° C. is 25% or more of the shrinkage rate under the conditions of the load of 20 g/1000 d and the same temperature.

Figure 1:
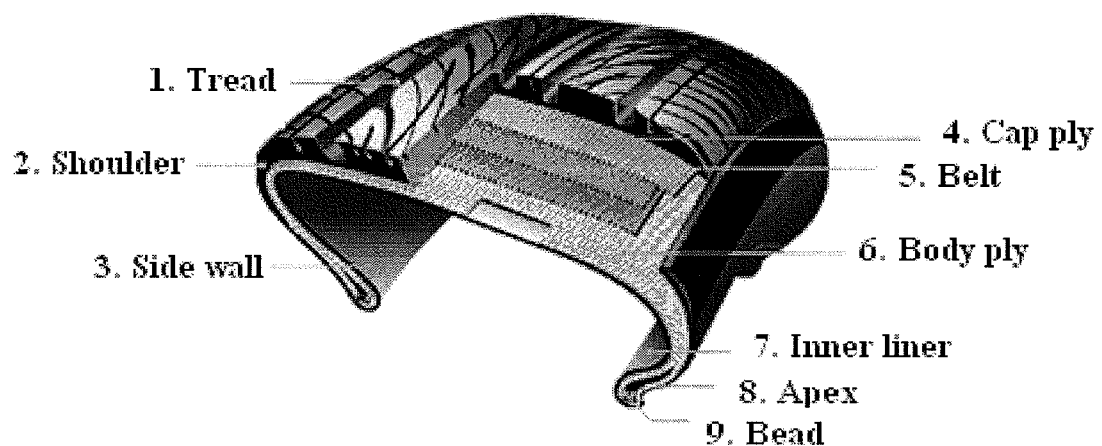
FIG. 1 is a partial cut-away perspective view illustrating a structure of a general tire.
Figure 2:
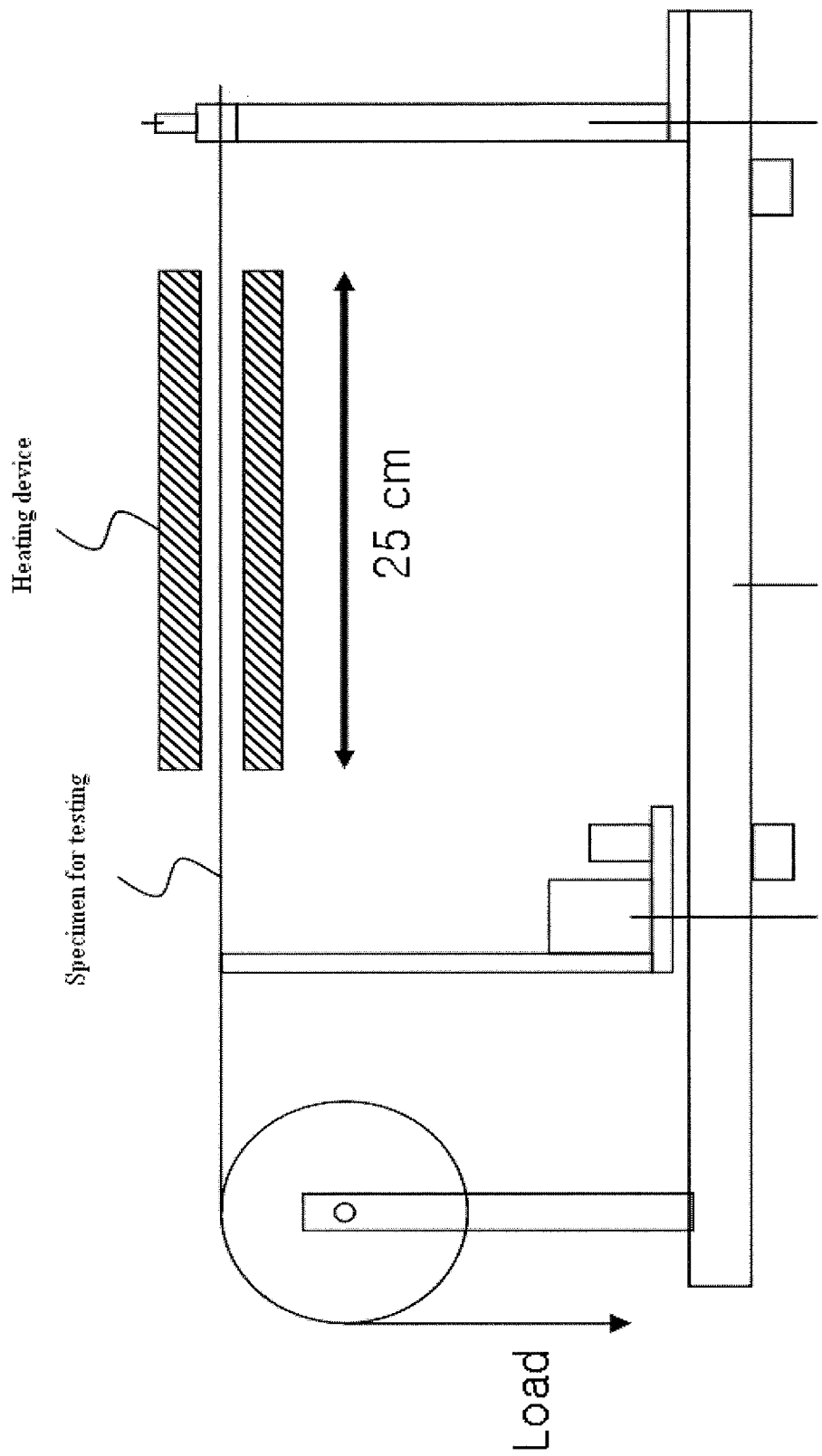
FIG. 2 is a schematic drawing of a shrinkage behavior tester used for measuring shrinkage rate, shrinkage force, or shrinkage behavior index (SBI) of tire cord.

At this time, the shrinkage rate of the drawn PET fiber can be measured by giving a prescribed load (for example, the load of 226 g/1000 d or 20 g/1000 d) to the drawn PET fiber at the fixed temperature of 180° C. in the state of hanging the drawn PET fiber on a shrinkage behavior tester (for example, FIG. 2).

The shrinkage rate of the drawn PET fiber according to one embodiment of the present invention is not largely changed even though the load given to the drawn fiber itself is largely changed. Particularly, it is revealed that not only the drawn PET fiber according to one embodiment of the present invention has low shrinkage rate but the change rate of the shrinkage rate is small even though the load given to the drawn fiber is largely changed, in comparison with the drawn fiber composed of the nylon 66, the general PET, the HMLS PET, and the like which are applied to a conventional tire cord. Therefore, the tire cord of which the shrinkage rate itself is low and the change rate of the shrinkage rate due to the change of the load is also small may be provided by the drawn PET fiber. Even though the driving speed of the car is changed and the load given to the tire cord is changed, the external shape deformation of the tire cord is prevented (i.e. the tire cord has good dimensional stability) and the tire including the same is not easily deformed. Therefore, it is possible to show good dimensional stability by using the drawn PET fiber according to one embodiment of the present invention and to provide the tire cord which can increase the controllability and the riding comport of the car by applying it to the cap ply cord and the like.

In addition, the drawn PET fiber according to one embodiment of the present invention includes 90 mol % or more of PET in order to show the properties suitable for the tire cord, and when the drawn PET fiber has the PET with a content of below 90 mol %, the drawn PET fiber and the tire cord prepared therefrom are hard to have the preferable properties intended by the present invention. Hereinafter, therefore, the term "PET" means the PET of which the content is 90 mol % or more unless otherwise explained.

Furthermore, the shrinkage force of the drawn PET fiber according to one embodiment of the present invention when the load of 226 g/1000 d is given at the temperature of 180° C. may be 60% or more of the shrinkage force when the load of 20 g/1000 d is given at the same temperature, and the shrinkage force when the load of 20 g/1000 d is given at the temperature of 180° C. may be 4.0 N or more, and preferably 4.0 to 6.0 N, and the shrinkage force when the load of 226 g/1000 d is given at the temperature of 180° C. may be 2.5 N or more, and preferably 2.5 to 4.0 N.

At this time, the shrinkage force of the drawn PET fiber can be measured by giving a prescribed load (for example, the load of 226 g/1000 d or 20 g/1000 d) to the drawn PET fiber at the fixed temperature of 180° C. in the state of hanging the drawn PET fiber on a shrinkage behavior tester (for example, FIG. 2).

Like this, the drawn PET fiber according to one embodiment of the present invention has not only superior dimensional stability but higher shrinkage force than the drawn nylon 66 fiber, and the high shrinkage force can be maintained even though any load is given to the drawn PET fiber. Therefore, it is possible to provide the tire cord having high shrinkage force as well as superior dimensional stability by using the drawn PET fiber, and the tire cord may be preferably applied to the cap ply cord, because, for example, the tire cord may effectively restrain the movement of the belt by wrapping the steel belt in the pneumatic tire.

On the other hand, the drawn PET fiber according to one embodiment of the present invention may be prepared by the method of melt-spinning the PET so as to prepare the undrawn fiber and drawing the undrawn fiber. Further, the drawn PET fiber having above mentioned properties can be prepared under the specific conditions or the specific proceeding methods of each step, that are directly or indirectly reflected to the properties of the drawn PET fiber, as disclosed above.

Particularly, it is revealed that the drawn PET fiber according to one embodiment of the present invention having the less change rate of the shrinkage rate due to the change of the load can be prepared by obtaining the undrawn PET fiber having crystallinity of 25% or more and the AOF of 0.15 or less by controlling the conditions of melt-spinning the PET, and using the same.

Basically, the PET has partially crystallized structure and is composed of crystalline regions and amorphous regions. However, the degree of crystallization of the undrawn PET fiber obtained under the controlled melt-spinning conditions is higher than that of the former known drawn PET fiber because of the oriented crystallization phenomenon, and the crystallinity is 25% or more and preferably 25 to 40%. The drawn PET fiber and the tire cord prepared from the undrawn PET fiber can show high shrinkage force and modulus due to such high crystallinity.

At the same time, the undrawn PET fiber shows the AOF of 0.15 or less, and preferably 0.08 to 0.15, which is largely lower than that of former known undrawn PET fiber. The AOF means that the degree of orientation of the chains included in the amorphous region of the undrawn fiber, and it has low value as the entanglement of the chains of the amorphous region increases. Generally, the drawn fiber and the tire cord prepared from the undrawn fiber having the low AOF value show low shrinkage force as well as low shrinkage rate, because the degree of disorder increases as the AOF decreases and the chains of the amorphous region becomes not a strained structure but a relaxed structure. However, the undrawn PET fiber obtained under the controlled melt-spinning conditions includes more cross-linking bonds per a unit volume, because the molecular chains constituting the undrawn PET fiber slip during the spinning process and form a fine network structure. On this account, the undrawn PET fiber may become the structure of which the chains of the amorphous region are strained in spite of the largely lower AOF value, and thus it shows developed crystalline structure and superior orientation characteristics due to this.

Therefore, it is revealed that the drawn PET fiber and the tire cord having low shrinkage rate and high shrinkage force at the same time can be prepared by using the undrawn PET fiber having such high crystallinity and low AOF, and moreover the drawn PET fiber and the tire cord having superior properties according to one embodiment of the present invention can be prepared.

Hereinafter, the preparing method of the drawn PET fiber according to one embodiment of the present invention is explained step-by-step more in detail, as follows.

In the preparing method of the drawn PET fiber, firstly, the undrawn PET fiber having high crystallinity and low AOF disclosed above is prepared by melt-spinning the PET.

At this time, the melt-spinning process may be carried out with a higher spinning stress in order to obtain the undrawn PET fiber satisfying such crystallinity and AOF. For example, the melt-spinning process may be carried out with the spinning stress of 0.85 g/d or more, and preferably 0.85 to 1.2 g/d. Also, for example, the melt-spinning speed of the PET may be controlled to be 3800 to 5000 m/min, and preferably 4000 to 4500 m/min in order to obtain such high spinning stress.

As results of experiments, it is revealed that the crystallinity increases as the oriented crystallization phenomenon occurs, and the undrawn PET fiber satisfying the crystallinity and the AOF disclosed above can be obtained as the molecular chains constituting the PET slip during the spinning process and form a fine network structure, according as the melt-spinning process of the PET is carried out with the high spinning stress and selectively high spinning speed. However, it is realistically not easy to control the spinning speed to be over 5000 m/min and it is also difficult to carry out the cooling process because of the excessive spinning speed.

Furthermore, the chips having an intrinsic viscosity of 0.8 to 1.3 and including 90 mol % or more of PET may be used in the melt-spinning as the PET in the preparing process of the undrawn PET fiber.

As disclosed above, it is possible to give the conditions of higher spinning speed and spinning stress to the preparing process of the undrawn PET fiber, and it is preferable that the intrinsic viscosity is 0.8 or more in order to carry out the spinning step preferably with the conditions. Also, it is preferable that the intrinsic viscosity is 1.3 or less in order to prevent the scission of the molecular chains due to the increase of the melting temperature of the chips and the increase of the pressure due to the extrusion amount in the spinning pack.

Furthermore, it is preferable that the chips are spun through the spinnerets designed for making linear density of a monofilament to be 2.0 to 4.0 denier, and preferably 2.5 to 3.0 denier. Namely, it is preferable that the linear density of the monofilament must be 2.0 denier or more in order to lessen the possibility of the fiber scission during the spinning and the fiber scission due to the interference of the fibers during the cooling, and it is also preferable that the linear density of the monofilament is 4.0 denier or less in order to give the sufficient spinning stress by raising the spinning draft.

Furthermore, the undrawn PET fiber may be prepared by adding the cooling process after the melt-spinning of the PET. Such cooling process may be preferably carried out according to the method of providing a cooling air of 15 to 60° C., and the cooling air flow may be preferably controlled to be 0.4 to 1.5 m/s in each temperature condition of the cooling air. With this, it is possible to prepare the drawn PET fiber showing several properties according to one embodiment of the present invention more easily.

On the other hand, the drawn fiber is prepared by drawing the undrawn fiber after preparing the undrawn PET fiber satisfying the crystallinity and the AOF disclosed above through the spinning step. At this time, the drawing process may be carried out under the condition of a drawing ratio of 0.1 to 1.55. In the undrawn PET, the crystalline region is developed, and the chains of the amorphous region also have low degree of orientation and form the fine network. Therefore, the scission of the fibers or hairiness may occur in the drawn fiber when the drawing process is carried out with the drawing ratio of over 1.55, and thus the drawn PET fiber prepared by the method is also hard to show the preferable properties. Furthermore, the strength of the drawn PET fiber and the tire cord prepared therefrom may be partially lowered when the drawing process is carried out with a relatively low drawing ratio. However, it is possible to prepare the PET tire cord having the strength of 6 g/d or more, which is suitable to be applied for the cap ply cord and the like for example, under the drawing ratio of 1.0 or more, and thus the drawing process may be preferably carried out with the drawing ratio of 1.0 to 1.55.

The drawn PET fiber prepared by the method disclosed above may show the superior properties according to one embodiment of the present invention, that is, the superior properties such as less change rate of the shrinkage rate by load, low change rate of the shrinkage force by load, high shrinkage force, and so on.

Furthermore, the PET tire cord including the drawn PET fiber disclosed above according to another embodiment of the present invention is provided.

Such PET tire cord may be a cord of which the shrinkage behavior index (SBI) defined by the following Calculation Formula 1 is 0.1 (g/d)/% or more under the load of 0.0565 g/d and the temperature of 180° C.:

$$\text{Shrinkage behavior factor} = \text{Shrinkage force (g/d)} / \text{Shrinkage rate(\%)}. \quad \text{[Calculation Formula 1]}$$

In Calculation Formula 1, the shrinkage force may be determined as the value measured by the shrinkage behavior tester illustrated in FIG. 2 at the fixed temperature, for example at 180° C., for 2 minutes after fixing the tire cord, which is an object of measuring, with the initial load of 0.0565 g/d. Furthermore, the shrinkage rate may be determined as the value measured by the shrinkage behavior tester at the fixed temperature, for example at 180° C., for 2 minutes, with the fixed load of 0.0565 g/d.

The PET tire cord according to another embodiment of the present invention showing such SBI has high shrinkage force as well as low shrinkage rate, and particularly, the ratio of the shrinkage rate and the shrinkage force is 0.1 (g/d)/% or more that is most suitable. According to this, the PET tire cord not only is superior in the dimensional stability but can effectively restrain the movement of the steel belt by wrapping the belt in the tire. Therefore, the PET tire cord may be preferably applied to the cap ply cord and the like of the pneumatic tire.

It is more preferable that the SBI of the PET tire cord according to another embodiment of the present invention is 0.1 to 0.3 (g/d)/% under the conditions of the load of 0.0565 g/d and the temperature of 180° C., and the SBI may be 0.15 (g/d)/% or more, and preferably 0.20 to 0.40 (g/d)/% under the conditions of the load of 0.0565 g/d and the temperature of 80° C. which corresponds to the temperature of the pneumatic tire during high speed driving.

Hereby, the PET tire cord can show superior dimensional stability even during high speed driving of the car, and it is possible to apply the same to the cap ply cord and the like and to increase the high speed driving performance, the controllability, or the riding comport of the car, because the cord restrains the movement of the steel belt effectively in the tire.

Furthermore, the shrinkage force under the conditions of the load of 0.0565 g/d and the temperature of 180° C. may be 0.24 g/d or more, and preferably 0.24 to 0.60 g/d in order to restrain the movement of the steel belt more effectively in the tire and to be preferably applied to the cap ply cord, and the shrinkage force under the conditions of the load of 0.0565 g/d and the temperature of 80° C. may be 0.03 g/d or more, and preferably 0.05 to 0.30 g/d or more in order to show such characteristics even during the high speed driving.

Furthermore, according to still another embodiment of the present invention, the PET tire cord of which the shrinkage rate under the conditions of the load of 226 g/cord and the temperature of 180° C. is 50% or more of the shrinkage rate under the conditions of the load of 20 g/cord and the same temperature is provided.

At this time, the shrinkage rate of the PET tire cord may be determined as the value measured according to the testing method of ASTM D4974 by using the shrinkage behavior tester (for example, FIG. 2) at the fixed temperature, for example at 180° C., for 2 minutes after fixing the tire cord, which is an object of measuring, with the fixed load (for example, the load of 226 g/cord (2000 d) or 20 g/cord (2000 d)).

The PET tire cord according to still another embodiment of the present invention shows the shrinkage rate that is not largely changed even though the load given to the tire cord itself is largely changed. Particularly, it is revealed that the PET tire cord according to still another embodiment of the present invention has small change rate of the shrinkage rate due to the change of the load given to itself in comparison with the tire cord composed of the nylon 66, the general PET, the HMLS PET, and the like. That is, the external shape deformation of the tire cord is prevented (i.e. the tire cord has good dimensional stability) and the tire including the same is not deformed easily even though the driving speed of the car is changed and the load given to the tire cord is changed, because the change rate of the shrinkage rate of such PET tire cord is small as well as the shrinkage rate itself is not large. Therefore, the PET tire cord may be applied as the cap ply cord and the like, and increase the controllability or the high speed driving performance, and the riding comport of the car.

Furthermore, the shrinkage force of the PET tire cord according to still another embodiment of the present invention when the load of 226 g/cord is given at the temperature of 180° C. may be 60% or more, and preferably 70% or more, of the shrinkage force when the load of 20 g/cord is given at the same temperature, and the shrinkage force when the load of 20 g/cord is given at the temperature of 180° C. may be 0.15 g/d or more, and the shrinkage force when the load of 226 g/cord is given at the temperature of 180° C. may be 0.09 g/d or more. Furthermore, the SBI defined by the following Calculation Formula 1 of tire cord according to still another embodiment of the present invention may be 0.04 (g/d)/% or more when the load of 226 g/cord is given at the temperature of 180° C.:

$$\text{Shrinkage behavior factor} = \text{Shrinkage force (g/d)} / \text{Shrinkage rate(\%)}. \quad \text{[Calculation Formula 1]}$$

At this time, the shrinkage force of the PET tire cord may be determined as the value measured according to the testing method of ASTM D5591 by using the shrinkage behavior tester (for example, FIG. 2) at the fixed temperature, for example at 180° C., for 2 minutes after fixing the tire cord, which is an object of measuring, with the fixed load (for example, the load of 226 g/cord (2000 d) or 20 g/cord (2000 d)). And the SBI can be calculated by substituting the above mentioned shrinkage rate and the shrinkage force, which are measured under the fixed load and temperature (for example, the load of 226 g/cord and the temperature of 180° C.) according to the testing method of ASTM D4974 and ASTM D5591 respectively, into Calculation Formula 1.

Like this, the PET tire cord according to still another embodiment of the present invention not only has superior dimensional stability but shows higher shrinkage force than the nylon 66 tire cord, and such high shrinkage force can be maintained even though any load is given to the PET tire cord. Furthermore, the tire cord can show superior SBI due to the high shrinkage force and the low shrinkage rate. Therefore, the PET tire cord shows superior dimensional stability and can be preferably applied to the cap ply cord, because it can effectively restrain the movement of the steel belt in the pneumatic tire, for example, by wrapping the steel belt.

On the other hand, the shape of the PET tire cord according to another embodiment or still another embodiment of the present invention disclosed above is not specifically limited, and thus it may have equal shape with conventional cap ply cords. More particularly, such PET tire cord may have a shape of a dipped cord, of which the total linear density per cord is 1000 to 5000 denier (d), the number of ply is 1 to 3, and the twisting level is 200 to 500 TPM (twist per meter), according to the shape of conventional cap ply cord.

Furthermore, the PET tire cord may have strength of 5 to 8 g/d, elongation (intermediate elongation at the load of 4.5 kg) of 1.5 to 5.0% and preferably 2.0 to 5.0%, elongation at break of 10 to 25%, and shrinkage rate (177° C., 30 g, 2 min) of 0.5 to 5.0% and preferably 2.0 to 5.0%. The tire cord can be preferably applied to the cap ply cord, according as it shows the properties, such as the strength, the elongation, and the like, of the above range.

Furthermore, the PET tire cord may be applied to the pneumatic tire as the cap ply cord. The cap ply cord has superior dimensional stability and its external shape is hardly deformed, and thus the tire in which the PET tire cord is included is also not deformed easily. Therefore, the tire can improve the controllability of the riding comfort of the car. Furthermore, the tire in which the cap ply cord is included can show stable high speed driving performance because the PET tire cord has several properties able to restrain the movement of the steel belt and suitable for the cap ply cord.

Simply, the PET tire cord according to another embodiment or still another embodiment of the present invention disclosed above is mainly explained by supposing that the cord is used as the cap ply cord, however, the use of the PET tire cord is not limited to this and it is of course that the cord may be used for the other uses such as a body ply cord and the like.

On the other hand, the tire cord according to another embodiment or still another embodiment of the present invention may be prepared by the method of melt-spinning the PET so as to prepare the undrawn PET fiber, drawing the undrawn PET fiber so as to prepare the drawn PET fiber, and twisting the drawn PET fibers and dipping the same in an adhesive so as to prepare a dipped cord. The PET tire cord having above mentioned properties can be prepared under the specific conditions or the specific proceeding methods of each step, that are directly or indirectly reflected to the properties of the prepared tire cord.

For example, it is revealed that the tire cord according to another embodiment or still another embodiment of the present invention having above mentioned properties can be provided by melt-spinning the PET with the condition of higher spinning stress and selectively high spinning speed so as to prepare the undrawn PET fiber having crystallinity of 25% or more and the AOF of 0.15 or less, and preparing the drawn PET fiber and the tire cord by using the same. Therefore, the PET tire cord according to another embodiment or still another embodiment of the present invention may be prepared by using the drawn PET fiber according to one embodiment of the present invention, for example, the drawn fiber obtained from the undrawn PET fiber having high crystallinity and low AOF.

That is, the drawn PET fiber having high shrinkage force and low shrinkage rate together can be prepared because of the high crystallinity and the low AOF of the undrawn PET fiber, and thus the PET tire cord having superior properties such as higher SBI, more improved shrinkage force, less change rate of the shrinkage rate by load, and so on can be prepared by using the same.

Therefore, the tire cord according to another embodiment or still another embodiment of the present invention may be prepared by using the drawn PET fiber, after preparing the undrawn PET fiber having high crystallinity and low AOF and preparing the drawn PET fiber according to one embodiment of the present invention from the same. The PET tire cord is prepared into a dipped cord by twisting the drawn PET fibers and dipping the same into the adhesive, wherein the twisting process and the dipping process follow the conditions and the conventional methods of preparing PET tire cord.

The PET tire cord prepared like this may have total linear density of 1000 to 5000 denier, number of ply of 1 to 3, and twisting level of 200 to 500 TPM, and may also show superior properties disclosed above, for example, higher SBI, less change rate of the shrinkage rate by load, high shrinkage force, high strength, and so on.

EXAMPLES

Hereinafter, the technical features and the operations of present invention are described in further detail through preferable examples. However, the following examples are only for the understanding of the present invention and the present invention is not limited to or by them.

Example 1

A PET polymer of which the intrinsic viscosity was 1.05 was used, and the undrawn fiber was prepared by melt-spinning the PET polymer under the spinning stress of 1.15 g/d and the spinning speed of 4500 m/min, and cooling the same according to conventional preparing method. And then, the drawn PET fiber of Example 1 was prepared by drawing the undrawn fiber with the drawing ratio of 1.24, and heat-setting and winding the same.

The PET tire cord of Example 1 was prepared by Z-twisting (counter-clockwise twisting) the drawn PET fibers of which the total linear density was 1000 denier with the twisting level of 430 TPM, S twisting (clockwise twisting) 2 plies of the Z twisted fibers with the same twisting level, dipping and passing the same through an resorcinol/formaldehyde/latex (RFL) adhesive solution, and drying and heat-treating the same.

The composition of the RFL adhesive solution and the conditions of the drying and the heat-setting process followed the conventional conditions for treating PET cord.

Example 2

The drawn PET fiber and the PET tire cord of Example 2 were prepared substantially according to the same method as in Example 1, except that the undrawn fiber was prepared by melt-spinning the PET polymer under the spinning stress of 0.92 g/d and the spinning speed of 4000 m/min and cooling the same in the preparing process of the drawn PET fiber, and the drawn PET fiber was prepared by drawing the undrawn fiber with the drawing ratio of 1.46, and heat-setting and winding the same.

Examples 3-6

The drawn PET fibers and the PET tire cords of Examples 3-6 were prepared substantially according to the same method as in Example 1, except that the conditions of the spinning speed, the spinning stress, the drawing ratio, or the intrinsic viscosity was changed in the preparing method of the drawn PET fiber as disclosed in the following Table 1.

TABLE 1

| Conditions | Example 3 | Example 4 | Example 5 | Example 6 |
|---|---|---|---|---|
| Spinning speed (m/min) | Same to Example 1 | Same to Example 1 | 3800 | 4800 |
| Spinning stress (g/d) | 0.98 | 1.23 | 0.86 | 1.19 |
| Drawing ratio | Same to Example 1 | Same to Example 1 | 1.54 | 1.16 |
| Intrinsic viscosity | 0.9 | 1.2 | Same to Example 1 | Same to Example 1 |

Example 7

The PET tire cord of Example 7 was prepared substantially according to the same method as in Example 1, except that the drawn PET fibers of Example 1 were Z-twisted with the twisting level of 260 TPM and then 2 plies of the Z twisted fibers were S co-twisted with the same twisting level.

Example 8

The PET tire cord of Example 8 was prepared substantially according to the same method as in Example 2, except that the drawn PET fibers of Example 2 were Z-twisted with the twisting level of 260 TPM and then 2 plies of the Z twisted fibers were S co-twisted with the same twisting level.

Example 9

The PET tire cord of Example 9 was prepared substantially according to the same method as in Example 1, except that the drawn PET fibers of Example 1 were Z-twisted with the twisting level of 360 TPM and then 2 plies of the Z twisted fibers were S co-twisted with the same twisting level.

Example 10

The PET tire cord of Example 10 was prepared substantially according to the same method as in Example 2, except that the drawn PET fibers of Example 2 were Z-twisted with the twisting level of 360 TPM and then 2 plies of the Z twisted fibers were S co-twisted with the same twisting level.

Comparative Example 1

Preparation of the Drawn PET Fiber and the PET Tire Cord by Using a Common PET Fiber The drawn PET fiber and the PET tire cord of Comparative Example 1 were prepared substantially according to the same method as in Example 1, except that the undrawn fiber was prepared by melt-spinning the PET polymer of which the intrinsic viscosity was 1.05 under the spinning stress of 0.06 g/d and the spinning speed of 800 m/min, and the drawn PET fiber was prepared by drawing the undrawn fiber with the drawing ratio of 6.0.

Comparative Example 2

Preparation of the Drawn PET Fiber and the PET Tire Cord by Using a HMLS Fiber

The drawn PET fiber and the PET tire cord of Comparative Example 2 were prepared substantially according to the same method as in Example 1, except that the undrawn fiber was prepared by melt-spinning the PET polymer of which the intrinsic viscosity was 1.05 under the spinning stress of 0.52 g/d and the spinning speed of 3000 m/min and the drawn fiber was prepared by drawing the undrawn fiber with the drawing ratio of 1.8.

Comparative Example 3

Preparation of the Drawn Fiber and the Tire Cord by Using a Nylon 66 Fiber

The undrawn fiber was prepared by melt-spinning the nylon 66 polymer of which the relative viscosity was 3.3 with the spinning speed of 600 m/min and cooling, and then the drawn fiber of Comparative Example 3 was prepared by drawing the undrawn fiber with the drawing ratio of 5.5, and heat-setting and winding the same.

The tire cord of Comparative Example 3 was prepared by Z-twisting the drawn PET fibers of which the total linear density was 840 denier with the twisting level of 310 TPM, S twisting 2 plies of the Z twisted fibers with the same twisting level, dipping and passing the same through the RFL adhesive solution, and drying and heat-treating the same.

The composition of the RFL adhesive solution and the conditions of the drying and the heat-setting process followed the conventional conditions for treating nylon 66 cord.

Firstly, the crystallinity and the AOF of the undrawn PET fibers obtained in Examples 1 to 6 and Comparative Examples 1 and 2 were measured according to the following method, and the measured results are listed in the following Table 2 (the crystallinity and the AOF of Examples 7 to 10 were not measured separately, because the undrawn PET fiber and the drawn fiber of Example 1 or 2 was used at it is):

Crystallinity: the density was measured by after preparing a density gradient tube by using $CCl_4$ and n-heptane, and the crystallinity was calculated by using the following calculation formula:

$$PET \text{ Crystallinity}(\%) = Xc(\%) = \left(\frac{\rho - \rho_a}{\rho_c - \rho_a}\right) \times 100$$

wherein, $\beta_a = 1.336$, and $\beta_c = 1.457$ in case of the PET.

Amorphous orientation factor (AOF): the AOF was calculated according to the following formula by using the birefringence index measured by using a polarized micrometer and the crystal orientation factor (COF) measured by X-ray diffraction (XRD):

AOF=(birefringence index−crystallinity(%)
  *0.01*COF*0.275)/((1−crystallinity(%)*0.01)
  *0.22).

TABLE 2

|  | Example 1 | Example 2 | Example 3 | Example 4 | Example 5 | Example 6 | Comparative Example 1 | Comparative Example 2 |
|---|---|---|---|---|---|---|---|---|
| Crystallinity (%) | 36 | 30 | 34 | 36 | 28 | 38 | 2 | 9 |
| AOF | 0.009 | 0.093 | 0.015 | 0.012 | 0.120 | 0.002 | 0.005 | 0.245 |

Subsequently, the shrinkage force and the shrinkage rate were measured with regard to the drawn fibers prepared in Examples 1 to 6 and Comparative Examples 2 and 3, according to the following method by using the shrinkage behavior tester (TestRite Co., MK-V) illustrated in FIG. 2, and the change of the shrinkage force due to the change of the load given to the drawn fiber is listed in Tables 3 and 4, and the change of the shrinkage rate is listed in Tables 5 and 6.

Shrinkage force (g/d): the initial load was given to each drawn fiber with the various loads of 20 g/1000 d, 60 g/1000 d, 113 g/1000 d, 160 g/1000 d, and 226 g/1000 d, in the state of hanging the drawn fibers prepared by Examples 1 to 6 and Comparative Examples 2 and 3, respectively, on the shrinkage behavior tester. Whenever the initial load was changed, the shrinkage force was measured at the fixed temperature of 180° C. in the fixed state.

TABLE 3

| Load (g/1000 d) | Example 1 (Shrinkage force; N) | Example 2 (Shrinkage force; N) | Example 3 (Shrinkage force; N) | Example 4 (Shrinkage force; N) |
| --- | --- | --- | --- | --- |
| 20 | 4.52 | 4.45 | 4.50 | 4.53 |
| 60 | 4.31 | 4.28 | 4.33 | 4.33 |
| 113 | 3.95 | 3.83 | 3.95 | 3.97 |
| 160 | 3.67 | 3.50 | 3.60 | 3.77 |
| 226 | 3.54 | 3.08 | 3.40 | 3.60 |

TABLE 4

| Load (g/1000 d) | Example 5 (Shrinkage force; N) | Example 6 (Shrinkage force; N) | Comparative Example 2 (Shrinkage force; N) | Comparative Example 3 (Shrinkage force; N) |
| --- | --- | --- | --- | --- |
| 20 | 4.46 | 4.90 | 3.58 | 3.17 |
| 60 | 4.30 | 4.42 | 3.36 | 2.93 |
| 113 | 3.89 | 4.10 | 2.89 | 2.44 |
| 160 | 3.62 | 3.92 | 2.55 | 2.13 |
| 226 | 3.48 | 3.80 | 2.02 | 1.66 |

Shrinkage rate (%): the initial load was given to each drawn fiber with the various loads of 20 g/1000 d, 60 g/1000 d, 113 g/1000 d, 160 g/1000 d, and 226 g/1000 d, in the state of hanging the drawn fibers prepared by Examples 1 to 6 and Comparative Examples 2 and 3, respectively, on the shrinkage behavior tester at the fixed temperature of 180° C. Whenever the initial load was changed, the shrinkage rate was measured.

TABLE 5

| Load (g/1000 d) | Example 1 (Shrinkage rate; %) | Example 2 (Shrinkage rate; %) | Example 3 (Shrinkage rate; %) | Example 4 (Shrinkage rate; %) |
| --- | --- | --- | --- | --- |
| 20 | 5.70 | 6.20 | 5.70 | 6.00 |
| 60 | 4.20 | 4.50 | 4.30 | 4.40 |
| 113 | 2.80 | 3.20 | 2.80 | 3.20 |
| 160 | 2.40 | 2.60 | 2.40 | 2.70 |
| 226 | 1.70 | 1.90 | 1.70 | 2.00 |

TABLE 6

| Load (g/1000 d) | Example 5 (Shrinkage rate; %) | Example 6 (Shrinkage rate; %) | Comparative Example 2 (Shrinkage rate; %) | Comparative Example 3 (Shrinkage rate; %) |
| --- | --- | --- | --- | --- |
| 20 | 6.30 | 5.50 | 9.7 | 8.4 |
| 60 | 4.50 | 4.00 | 6.6 | 6.7 |
| 113 | 3.30 | 2.70 | 4.2 | 5.0 |
| 160 | 2.70 | 2.30 | 3.0 | 3.8 |
| 226 | 2.10 | 1.50 | 1.9 | 2.7 |

Referring to Tables 3 and 4, it is recognized that the drawn PET fibers of Examples 1 to 6 prepared from the undrawn PET fibers having high crystallinity and low AOF show generally higher shrinkage force than not only the drawn HMLS fiber of Comparative Example 2 but the drawn nylon 66 fiber of Comparative Example 3.

Furthermore, it is recognized that the drawn PET fibers of Examples 1 to 6 maintain the high shrinkage force even though any load is given to the drawn fiber itself, but, on the contrary, the shrinkage force of the drawn fibers of Comparative Examples 2 and 3 decrease relatively largely as the load given to the drawn fiber itself is changed.

Therefore, it is recognized that the tire cords prepared from the drawn PET fibers of Examples 1 to 6 also show high shrinkage force and such high shrinkage force can be maintained even under any load, and thus the cords can restrain the movement of the steel belt effectively by wrapping the belt, for example, in the pneumatic tire, and may be applied to the cap ply cord preferably.

Furthermore, referring Tables 5 and 6, it is recognized that not only the basic shrinkage rates of the drawn PET fibers of Examples 1 to 6 are generally lower than the drawn fibers of Comparative Examples 2 and 3 but the degree of the change of the shrinkage rate is not so large even though the load given to the drawn fiber itself.

That is, considering Tables 3 to 6, it is recognized that not only the drawn PET fibers of Examples 1 to 6 have high shrinkage force while having lower shrinkage rate than the drawn HMLS fiber of Comparative Example 2 and the drawn nylon 66 fiber of Comparative Example 3 in all load conditions but the change rates thereof are also not large.

Therefore, the tire cords prepared from the drawn PET fibers of Examples 1 to 6 show high dimensional stability, and they may be preferably applied to the cap ply cord and the like because the tire cords may effectively restrain the movement of the steel belt in the tire because of the high shrinkage force.

Subsequently, the shrinkage force and the shrinkage rate were measured with regard to the tire cords prepared according to Examples 1 to 10 and Comparative Examples 1 to 3, according to the following method by using the shrinkage behavior tester as illustrated in FIG. 2, and the change of the shrinkage force due to the temperature change is listed in Table 7, and the change of the shrinkage rate due to the temperature change is listed in Table 8.

Shrinkage force (g/d): the force was measured at the specific temperature in the range of 80 to 180° C. after fixing each tire cord under the initial load of 0.0565 g/d by using the shrinkage behavior tester.

TABLE 7

| | \multicolumn{6}{c}{Unit: g/d} | | | | | |
|---|---|---|---|---|---|---|
| | 80° C. | 100° C. | 120° C. | 140° C. | 160° C. | 180° C. |
| Example 1 | 0.08 | 0.18 | 0.20 | 0.23 | 0.26 | 0.31 |
| Example 2 | 0.05 | 0.10 | 0.18 | 0.21 | 0.21 | 0.28 |
| Example 3 | 0.07 | 0.19 | 0.20 | 0.22 | 0.25 | 0.26 |
| Example 4 | 0.08 | 0.20 | 0.21 | 0.26 | 0.27 | 0.33 |
| Example 5 | 0.05 | 0.10 | 0.19 | 0.20 | 0.25 | 0.25 |
| Example 6 | 0.08 | 0.19 | 0.21 | 0.23 | 0.26 | 0.33 |
| Example 7 | 0.08 | 0.19 | 0.21 | 0.23 | 0.26 | 0.31 |
| Example 8 | 0.06 | 0.10 | 0.19 | 0.22 | 0.22 | 0.29 |
| Example 9 | 0.06 | 0.19 | 0.21 | 0.23 | 0.25 | 0.31 |
| Example 10 | 0.06 | 0.10 | 0.18 | 0.21 | 0.21 | 0.30 |
| Comparative Example 1 | 0.03 | 0.07 | 0.11 | 0.11 | 0.12 | 0.21 |
| Comparative Example 2 | 0.01 | 0.02 | 0.03 | 0.03 | 0.05 | 0.06 |
| Comparative Example 3 | 0.02 | 0.05 | 0.08 | 0.11 | 0.16 | 0.21 |

Shrinkage rate (%): the shrinkage rate was measured at the specific temperature in the range of 80 to 180° C. under the initial load of 0.0565 g/d by using the shrinkage behavior tester.

TABLE 8

| | Unit: % | | | | | |
|---|---|---|---|---|---|---|
| | 80° C. | 100° C. | 120° C. | 140° C. | 160° C. | 180° C. |
| Example 1 | 0.2 | 0.6 | 1.1 | 1.5 | 1.8 | 2.1 |
| Example 2 | 0.2 | 0.6 | 1.1 | 1.4 | 1.7 | 1.9 |
| Example 3 | 0.2 | 0.6 | 1.1 | 1.5 | 1.9 | 2.1 |
| Example 4 | 0.4 | 0.8 | 1.4 | 1.8 | 2.3 | 2.9 |
| Example 5 | 0.2 | 0.6 | 1.2 | 1.6 | 2.1 | 2.5 |
| Example 6 | 0.2 | 0.6 | 1.0 | 1.4 | 1.6 | 1.8 |
| Example 7 | 0.2 | 0.6 | 1.1 | 1.5 | 1.7 | 2.2 |
| Example 8 | 0.2 | 0.6 | 1.1 | 1.5 | 1.7 | 2.3 |
| Example 9 | 0.2 | 0.6 | 1.1 | 1.5 | 1.8 | 2.1 |
| Example 10 | 0.2 | 0.6 | 1.1 | 1.5 | 1.8 | 2.3 |
| Comparative Example 1 | 0.2 | 0.7 | 1.6 | 2.2 | 2.6 | 3.3 |
| Comparative Example 2 | 0.1 | 0.3 | 0.7 | 1.0 | 1.1 | 1.3 |
| Comparative Example 3 | 0.4 | 0.8 | 1.4 | 2.2 | 2.8 | 4.3 |

The shrinkage behavior index (SBI) was calculated from the shrinkage rate and the shrinkage force measured above, and the change of the SBI according to each temperature is listed in the following Table 9.

TABLE 9

| | Unit: (g/d)/% | | | | | |
|---|---|---|---|---|---|---|
| | 80° C. | 100° C. | 120° C. | 140° C. | 160° C. | 180° C. |
| Example 1 | 0.38 | 0.31 | 0.19 | 0.15 | 0.14 | 0.15 |
| Example 2 | 0.26 | 0.17 | 0.16 | 0.15 | 0.13 | 0.15 |
| Example 3 | 0.36 | 0.31 | 0.18 | 0.15 | 0.13 | 0.12 |
| Example 4 | 0.21 | 0.25 | 0.15 | 0.14 | 0.12 | 0.11 |
| Example 5 | 0.23 | 0.17 | 0.16 | 0.13 | 0.12 | 0.10 |
| Example 6 | 0.41 | 0.31 | 0.21 | 0.17 | 0.16 | 0.18 |
| Example 7 | 0.41 | 0.32 | 0.19 | 0.15 | 0.15 | 0.14 |
| Example 8 | 0.28 | 0.17 | 0.19 | 0.22 | 0.13 | 0.13 |
| Example 9 | 0.31 | 0.32 | 0.19 | 0.15 | 0.14 | 0.15 |
| Example 10 | 0.28 | 0.17 | 0.16 | 0.14 | 0.12 | 0.13 |
| Comparative Example 1 | 0.15 | 0.10 | 0.07 | 0.05 | 0.05 | 0.06 |
| Comparative Example 2 | 0.10 | 0.07 | 0.04 | 0.03 | 0.05 | 0.05 |
| Comparative Example 3 | 0.05 | 0.05 | 0.06 | 0.05 | 0.06 | 0.05 |

Referring to Tables 7 to 9, it is recognized that the tire cord of Comparative Example 1 using the common PET fiber and the nylon 66 tire cord of Comparative Example 3 have relatively high shrinkage force but they show low SBI because their shrinkage rate is high, and the tire cord of Comparative Example 2 using the HMLS fiber has low shrinkage rate but it also shows low SBI because its shrinkage force is also low.

On the other hand, it is recognized that the PET tire cords of Examples 1 to 10 prepared from the undrawn PET fibers showing high crystallinity and low AOF have low shrinkage rate and high shrinkage force, and accordingly, they show high SBI.

Therefore, it is also recognized that the PET tire cords of Examples 1 to 10 show high shrinkage force and may effectively restrain the movement of the steel belt in the tire, even showing high dimensional stability due to the low shrinkage rate.

In addition, the shrinkage force and the shrinkage rate were measured with regard to the tire cords prepared in Examples 1 to 10 and Comparative Examples 2 and 3, according to the following method by using the shrinkage behavior tester illustrated in FIG. 2, and the shrinkage force according to the load given to the tire cord are listed in Table 10, and the shrinkage rates are listed in Table 11.

Shrinkage force (g/d): the shrinkage force was measured at the fixed temperature of 180° C. for 2 minutes after fixing each cord with the fixed load by using the shrinkage behavior tester, wherein the load given to the cord was 20 g/cord, 60 g/cord, 113 g/cord, 160 g/cord, and 226 g/cord, respectively.

TABLE 10

| | Unit: g/d | | | | |
|---|---|---|---|---|---|
| | 20 g/cord | 60 g/cord | 113 g/cord | 160 g/cord | 226 g/cord |
| Example 1 | 0.312 | 0.307 | 0.310 | 0.308 | 0.241 |
| Example 2 | 0.281 | 0.276 | 0.284 | 0.280 | 0.219 |
| Example 3 | 0.301 | 0.282 | 0.256 | 0.247 | 0.205 |
| Example 4 | 0.332 | 0.322 | 0.329 | 0.314 | 0.250 |
| Example 5 | 0.247 | 0.260 | 0.245 | 0.226 | 0.194 |
| Example 6 | 0.324 | 0.324 | 0.328 | 0.321 | 0.268 |
| Example 7 | 0.317 | 0.314 | 0.311 | 0.307 | 0.246 |
| Example 8 | 0.298 | 0.302 | 0.287 | 0.265 | 0.226 |
| Example 9 | 0.309 | 0.312 | 0.312 | 0.312 | 0.253 |
| Example 10 | 0.287 | 0.286 | 0.297 | 0.281 | 0.219 |
| Comparative Example 2 | 0.123 | 0.076 | 0.062 | 0.065 | 0.004 |
| Comparative Example 3 | 0.261 | 0.251 | 0.205 | 0.231 | 0.207 |

Shrinkage rate (%): the shrinkage rate was measured at the fixed temperature of 180° C. under the fixed load for 2 minutes by using the shrinkage behavior tester, wherein the load given to the cord was 20 g/cord, 60 g/cord, 113 g/cord, 160 g/cord, and 226 g/cord, respectively.

TABLE 11

| | Unit: % | | | | |
|---|---|---|---|---|---|
| | 20 g/cord | 60 g/cord | 113 g/cord | 160 g/cord | 226 g/cord |
| Example 1 | 2.8 | 2.5 | 2.1 | 1.8 | 1.5 |
| Example 2 | 2.7 | 2.4 | 1.9 | 1.8 | 1.6 |
| Example 3 | 2.5 | 2.4 | 2.1 | 1.8 | 1.6 |
| Example 4 | 3.4 | 3.0 | 2.9 | 2.4 | 2.1 |
| Example 5 | 3.1 | 2.8 | 2.5 | 2.3 | 2.3 |
| Example 6 | 2.4 | 2.3 | 1.8 | 1.6 | 1.4 |
| Example 7 | 2.6 | 2.3 | 2.2 | 1.8 | 1.7 |
| Example 8 | 2.6 | 2.4 | 2.3 | 1.8 | 1.7 |
| Example 9 | 2.6 | 2.5 | 2.1 | 2.0 | 1.7 |
| Example 10 | 2.7 | 2.5 | 2.3 | 2.1 | 1.8 |
| Comparative Example 2 | 3.0 | 2.2 | 1.3 | 1.1 | 0.7 |
| Comparative Example 3 | 7.2 | 6.0 | 4.3 | 4.0 | 3.5 |

The SBI was calculated from the shrinkage rate and the shrinkage force measured above, and the SBI according to the change of the load given to each cord is listed in the following Table 12.

TABLE 12

| | Unit: (g/d)/% | | | | |
|---|---|---|---|---|---|
| | 20 g/cord | 60 g/cord | 113 g/cord | 160 g/cord | 226 g/cord |
| Example 1 | 0.11 | 0.12 | 0.15 | 0.17 | 0.16 |
| Example 2 | 0.10 | 0.12 | 0.15 | 0.16 | 0.14 |
| Example 3 | 0.12 | 0.12 | 0.12 | 0.14 | 0.13 |
| Example 4 | 0.10 | 0.11 | 0.11 | 0.13 | 0.12 |
| Example 5 | 0.08 | 0.09 | 0.10 | 0.10 | 0.08 |
| Example 6 | 0.14 | 0.14 | 0.18 | 0.20 | 0.19 |
| Example 7 | 0.12 | 0.14 | 0.14 | 0.17 | 0.15 |
| Example 8 | 0.12 | 0.13 | 0.13 | 0.15 | 0.13 |
| Example 9 | 0.12 | 0.13 | 0.15 | 0.16 | 0.15 |
| Example 10 | 0.11 | 0.11 | 0.13 | 0.13 | 0.12 |
| Comparative Example 2 | 0.12 | 0.03 | 0.05 | 0.06 | 0.01 |
| Comparative Example 3 | 0.04 | 0.04 | 0.05 | 0.06 | 0.06 |

Referring to Tables 10 and 11, it is recognized that the tire cords of Examples 1 to 10 prepared from the undrawn PET fibers having high crystallinity and low AOF maintain their high shrinkage force and low shrinkage rate even though any load is given to the cord itself. On the contrary, it is recognized that the shrinkage force of the tire cord of Comparative Example 2 relatively largely decreases according to the change of the load given to the cord itself, and the shrinkage rate of the tire cord of Comparative Example 3 is largely changed according to the change of the load.

Furthermore, referring to Table 12, it is recognized that the cords of Examples 1 to 10 maintains regular SBI though any load is given to the cord itself, but, on the contrary, the shrinkage force or the SBI of the tire cords of Comparative Examples 2 and 3 are largely changed according to the change of the load given to the cord itself.

Therefore, it is recognized that not only the tire cords of Examples 1 to 10 show high shrinkage force and low shrinkage rate but the shrinkage force, the shrinkage rate, or the SBI calculated from the same can be maintained even under any load, and thus the cords may restrain the movement of the steel belt effectively by wrapping the steel belt in the tire and may be applied to the cap ply cord preferably.

In addition, it is recognized that the tire cords of Examples 1 to 10 show high dimensional stability, and the external shape deformation of the tire cord is prevented and the tire including the same is not easily deformed, even though the load given to the tire cord is changed by the change of the driving speed of the car. Therefore, the tire cords of Examples 1 to 10 make the stable high speed driving possible by applying the same to the cap ply cord and the like for the pneumatic tire, and can increase the controllability and the riding comport of the car.

What is claimed is:

1. A drawn polyethylene terephthalate (PET) fiber, including 90 mol % or more of PET, wherein the shrinkage rate under the conditions of the load of 226 g/1000 d and the temperature of 180° C. is 25% or more of the shrinkage rate under the conditions of the load of 20 g/1000 d and the same temperature,
   wherein the drawn PET fiber is obtained by drawing an undrawn PET fiber at a draw ratio of 0.1 to 1.55, and
   wherein the undrawn PET fiber has an amorphous orientation factor (AOF) of 0.15 or less.

2. The drawn PET fiber according to claim 1, wherein the shrinkage force under the conditions of the load of 226 g/1000 d and the temperature of 180° C. is 60% or more of the shrinkage force under the conditions of the load of 20 g/1000 d and the same temperature.

3. The drawn PET fiber according to claim 2, wherein the shrinkage force under the conditions of the load of 20 g/1000 d and the temperature of 180° C. is 4.0 N or more.

4. The drawn PET fiber according to claim 2, wherein the shrinkage force under the conditions of the load of 226 g/1000 d and the temperature of 180° C. is 2.5 N or more.

5. A preparing method of a drawn PET fiber including steps of:
   melt-spinning a polymer including 90 mol % or more of PET so as to prepare a undrawn PET fiber having crystallinity of 25% or more and an amorphous orientation factor (AOF) of 0.15 or less; and
   drawing the undrawn PET fiber with a drawing ratio of 0.1 to 1.55 so as to prepare the drawn PET fiber,
   wherein the melt-spinning step is carried out with a spinning stress of 0.85 g/d or more and a spinning speed of 3800 to 5000 m/min, and
   wherein the shrinkage rate of the undrawn PET fiber under the conditions of the load of 226 g/1000 d and the temperature of 180° C. is 25% or more of the shrinkage rate of the undrawn PET fiber under the conditions of the load of 20 g/1000 d and the same temperature.

6. The preparing method according to claim 5, wherein the polymer has an intrinsic viscosity of 0.8 to 1.3.

7. The preparing method according to claim 5, wherein the polymer is melt-spun through spinnerets designed for making linear density of a monofilament to be 2.0 to 4.0 denier.

8. The preparing method according to claim 5, further comprises a step of cooling the melt-spun polymer with a cooling air of 15 to 60° C., after melt-spinning the polymer in the step of preparing the undrawn PET fiber.

9. A polyethylene terephthalate tire cord including the drawn polyethylene terephthalate fiber according to claim 1.

10. A polyethylene terephthalate (PET) tire cord, of which a shrinkage behavior index (SBI) defined by the following Calculation Formula 1 is 0.1 (g/d)/% or more under the conditions of the load of 0.0565 g/d and the temperature of 180° C.:

$$\text{SBI} = \text{Shrinkage force (g/d)/Shrinkage rate(\%)}, \quad \text{Calculation Formula 1:}$$

wherein the PET tire cord is made from a drawn PET fiber that includes 90 mol % or more of PET, wherein the shrinkage rate of the drawn PET fiber under the conditions of the load of 226 g/1000 d and the temperature of 180° C. is 25% or more of the shrinkage rate under the conditions of the load of 20 g/1000 d and the same temperature, wherein the drawn PET fiber is obtained by drawing an undrawn PET at a draw ratio of 0.1 to 1.55, and wherein the undrawn PET has an amorphous orientation factor (AOF) of 0.15 or less.

11. The PET tire cord according to claim 10, wherein the shrinkage behavior index is 0.20 (g/d)/% or more under the conditions of the load of 0.0565 g/d and the temperature of 80° C.

12. The PET tire cord according to claim 10, wherein the shrinkage force is 0.24 g/d or more under the conditions of the load of 0.0565 g/d and the temperature of 180° C.

13. The PET tire cord according to claim 10, wherein the shrinkage force is 0.03 g/d or more under the conditions of the load of 0.0565 g/d and the temperature of 80° C.

14. A polyethylene terephthalate (PET) tire cord of which the shrinkage rate under the load of 226 g/cord and the temperature of 180° C. is 50% or more of the shrinkage rate under the load of 20 g/cord and the same temperature wherein the PET tire cord is made from a drawn PET fiber that includes 90 mol % or more of PET, wherein the drawn PET fiber is obtained by drawing an undrawn PET at a draw ratio of 0.1 to 1.55, and wherein the undrawn PET has an amorphous orientation factor (AOF) of 0.15 or less.

15. The PET tire cord according to claim 14, wherein the shrinkage force under the conditions of the load of 226 g/cord and the temperature of 180° C. is 60% or more of the shrinkage force under the conditions of the load of 20 g/cord and the same temperature.

16. The PET tire cord according to claim 15, wherein the shrinkage force under the conditions of the load of 20 g/cord and the temperature of 180° C. is 0.15 g/d or more.

17. The PET tire cord according to claim 15, wherein the shrinkage force under the conditions of the load of 226 g/cord and the temperature of 180° C. is 0.09 g/d or more.

18. The PET tire cord according to claim 15, wherein a shrinkage behavior index (SBI) defined by the following Calculation Formula 1 is 0.04 (g/d)/% or more under the conditions of the load of 226 g/cord and the temperature of 180° C.:

SBI=Shrinkage force (g/d)/Shrinkage rate(%).Calculation Formula 1:

19. The PET tire cord according to claim 9, having strength of 5 to 8 g/d, an intermediate elongation (@4.5 kg) of 1.5 to 5.0%, an elongation at break of 10 to 25%, and a shrinkage rate (177° C., 30 g, 2 min) of 0.5 to 5.0%.

20. The PET tire cord according to claim 9, having a total linear density of 1000 to 5000 denier, a number of ply of 1 to 3, and a twisting level of 200 to 500 TPM.

21. The PET tire cord according to claim 9, wherein the tire cord is a cap ply cord.

22. A preparing method of a PET tire cord, including steps of:

melt-spinning a polymer including 90 mol % or more of PET so as to prepare a undrawn PET fiber having crystallinity of 25% or more and an amorphous orientation factor of 0.15 or less;

drawing the undrawn PET fiber with a drawing ratio of 0.1 to 1.55 so as to prepare a drawn PET fiber; and twisting the drawn PET fibers and dipping the same in an adhesive to obtain the PET tire cord, wherein the melt-spinning step is carried out with a spinning stress of 0.80 g/d or more and a spinning speed of 3800 to 5000 m/min, wherein the shrinkage rate of the undrawn PET fiber under the conditions of the load of 226 g/1000 d and the temperature of 180° C. is 25% or more of the shrinkage rate of the undrawn PET fiber under the conditions of the load of 20 g/1000 d and the same temperature.

23. The preparing method according to claim 22, wherein the polymer has an intrinsic viscosity of 0.8 to 1.3.

24. The preparing method according to claim 22, wherein the polymer is melt-spun through spinnerets designed for making linear density of a monofilament to be 2.0 to 4.0 denier.

25. The preparing method according to claim 22, which further comprises a step of cooling the melt-spun polymer with a cooling air of 15 to 60° C. after melt-spinning the polymer in the step of preparing the undrawn PET fiber.

26. A pneumatic tire including the tire cord according to claim 9.

27. The pneumatic tire according to claim 26, wherein the tire cord is applied to a cap ply cord.

28. The PET tire cord according to claim 10, having a strength of 5 to 8 g/d, an intermediate elongation (@4.5 kg) of 1.5 to 5.0%, an elongation at break of 10 to 25%, and a shrinkage rate (177° C., 30 g, 2 min) of 0.5 to 5.0%.

29. The PET tire cord according to claim 14, having a strength of 5 to 8 g/d, an intermediate elongation (@4.5 kg) of 1.5 to 5.0%, an elongation at break of 10 to 25%, and a shrinkage rate (177° C. 30 g, 2 min) of 0.5 to 5.0%.

30. The PET tire cord according to claim 10, having a total linear density of 1000 to 5000 denier, a number of ply of 1 to 3, and a twisting level of 200 to 500 TPM.

31. The PET tire cord according to claim 14, having a total linear density of 1000 to 5000 denier, a number of ply of 1 to 3, and a twisting level of 200 to 500 TPM.

32. The PET tire cord according to claim 10, wherein the tire cord is a cap ply cord.

33. The PET tire cord according to claim 14, wherein the tire cord is a cap ply cord.

34. A pneumatic tire including the tire cord according to claim 10.

35. A pneumatic tire including the tire cord according to claim 14.

* * * * *